(12) United States Patent
Rao

(10) Patent No.: US 6,576,038 B1
(45) Date of Patent: Jun. 10, 2003

(54) METHOD TO AGGLOMERATE METAL PARTICLES AND METAL PARTICLES HAVING IMPROVED PROPERTIES

(75) Inventor: Bhamidipaty K. D. P. Rao, Wyomissing, PA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/314,512

(22) Filed: May 19, 1999

Related U.S. Application Data (60) Provisional application No. 60/086,601, filed on May 22, 1998.

(51) Int. Cl.[7] ................................................. B22F 1/00
(52) U.S. Cl. ........................... 75/255; 148/513; 419/30; 419/32
(58) Field of Search ........................... 75/255; 148/513; 419/32, 30

(56) References Cited

U.S. PATENT DOCUMENTS

| | | | |
|---|---|---|---|
| 3,071,463 A | | 1/1963 | Hausner et al. ................ 75/214 |
| 3,397,057 A | | 8/1968 | Harringtron et al. .......... 75/213 |
| 4,009,007 A | * | 2/1977 | Fry ............................. 29/182.5 |
| 4,017,302 A | * | 4/1977 | Bates et al. ................ 75/5 BB |
| 4,141,719 A | * | 2/1979 | Hakko ....................... 75/5 BB |
| 4,483,819 A | * | 11/1984 | Albrecht et al. ................ 419/2 |
| 4,544,403 A | * | 10/1985 | Schiele et al. ............. 75/5 AB |
| 4,582,530 A | * | 4/1986 | Heinrich et al. ........... 75/5 AB |
| 4,648,900 A | | 3/1987 | Bostrom et al. ................ 75/3 |
| 4,740,238 A | * | 4/1988 | Schiele ....................... 75/5 BB |

FOREIGN PATENT DOCUMENTS

| | | |
|---|---|---|
| EP | 930003 | 6/1963 |
| JP | 04362101 | 12/1991 |
| JP | 65502 | 3/1993 |

OTHER PUBLICATIONS

Maskara, et al., Agglomeration during the Drying of Fine Silica Powders, Part II: The Role of Particle Solubility, J. Am. Ceram. Soc., 80 (7) 1715–22 (1997).
Derwent Abstract No. 93–033288 (JP 91–0160800), 1991.
Derwent Abstract No. 1991–331680 (SU 1988–4424430), 1998.
International Search Report for PCT/US99/11149 mailed Oct. 12, 1999.

* cited by examiner

Primary Examiner—Daniel J. Jenkins (57) ABSTRACT

A method to agglomerate metal particles such as tantalum and niobium powders is described which includes combining a volatilizable or vaporizable liquid with the particles to form wet particles; compacting the wet particles; drying the compacted wet particles to form a cake; and heat treating the cake to form the agglomerated particles. Also described are agglomerated particles obtained by this method and further, particles, preferably tantalum or niobium powder, having a flow rate of at least about 65 mg/sec and/or an improved pore size distribution, and/or a higher Scott Density. Capacitors made from tantalum powder and niobium powder are also described.

38 Claims, 4 Drawing Sheets

METHOD TO AGGLOMERATE METAL PARTICLES AND METAL PARTICLES HAVING IMPROVED PROPERTIES

This application is entitled to benefit from prior Provisional Patent Application No. 60/086,601 filed May 22, 1998, which is incorporated in its entirety by reference herein.

BACKGROUND OF THE INVENTION

The present invention relates to metal particles and methods of agglomerating the same.

Efforts are always being made to improve the handling of metal powder, such as tantalum powders. In particular, fine powders, for instance, having particle sizes of 0.1–200 microns, can be quite difficult to work with and thus, methods to agglomerate fine metal powder have been developed, such as the method described in Japanese Kokai [1992]4-362101 for tantalum powder.

However, besides developing methods to agglomerate fine metal powders, efforts have also been made to agglomerate such powders in such a manner that flow properties and/or other desirable properties are maintained or improved.

Accordingly, there is a demand to develop methods of agglomerating fine metal particles such as. tantalum powder, not only to address the problems of fine powders but also to lead to agglomerated metal particles that have desirable properties such as good flow properties and improved pore size distribution.

SUMMARY OF THE INVENTION

In accordance with one aspect of the present invention, there is provided a method to agglomerate metal particles, preferably tantalum and/or niobium particles, which includes the steps of combining a volatilizable or vaporizable liquid with the metal particles to form wet metal particles. These wet metal particles are compacted and then dried to form a cake. The cake is then thermally agglomerated or heat treated to result in the agglomerated metal particles.

In accordance with another aspect of the present invention, there is provided metal particles, and especially tantalum and/or niobium particles having a flow rate of at least about 65 mg/sec. and an improved pore size distribution.

Further, the present invention relates to capacitor anodes containing the tantalum and/or niobium powder of the present invention.

It is to be understood that both the foregoing general description and the following detailed description are exemplary and explanatory only and are intended to provide further explanation of the present invention as claimed.

DETAILED DESCRIPTION OF THE PRESENT INVENTION

An embodiment of the present invention relates to a method to agglomerate metal particles. The method includes the steps of combining a volatilizable or vaporizable liquid with the metal particles to form wet metal particles. The wet metal particles are compacted, and then subsequently dried to form a cake. The cake is then heat treated to result in the agglomerated metal particles.

For purposes of the present invention, the metal particles can be any type of metal particles. Examples of metal particles include, but are not limited to, metals, alloys, mixtures, and the like. Specific examples include tantalum, niobium, iron, zinc, alloys containing any of the foregoing, and mixtures thereof. Preferably, the metal particles comprise powders of niobium or tantalum, or alloys comprising tantalum and niobium.

The metal particles which are agglomerated by the methods of the present invention can be any particle shape or size, preferably, the particles are in the form of a powder, and this powder generally has particle size ranges from about 0.1 micron to about 200 microns. The shape of the metal particles can be any shape, such as angular, nodular, flaked, or any combination thereof. Preferably, the shape is nodular, especially when the metal particle is tantalum and/or niobium.

With respect to the method of agglomerating metal particles, the step of combining a volatilizable or vaporizable liquid with the metal particles to form wet metal particles can be done in any conventional manner which includes methods of simply mixing a solid with a liquid. For instance, simple stirring can be used as well as more sophisticated methods of blending and milling, such as with a mixer-muller. Alternatively, the liquid can simply be poured on top of a container containing the metal particles with or without mixing or stirring.

The volatilizable or vaporizable liquid can be any liquid which is capable of these properties. Examples include, but are not limited to, water, water-containing liquids, alcohols, aromatic-containing liquids, alkane-containing liquids, and the like. Preferably, the volatilizable or the vaporizable liquid is aqueous in nature and more preferably is water, and more preferably is deionized water. Any element/chemical helpful in controlling the sintering kinetics of the powders at high temperatures can be added to the water at the desired proportions.

Preferably, the amount of liquid combined with the metal particles to form wet metal particles is an amount which is sufficient to wet the particles without forming a slurry. Preferably, the amount of liquid contained with the metal particles is an amount which will result in the formation of a paste. For instance, the amount of liquid present with metal particles having pores should be such that the liquid enters the pores of the metal particles and most preferably, enters substantially all the pores of the metal particles. When the liquid is added in an amount which forms a slurry, the liquid may exit the pores of the metal particles due to effects of gravity and the like. Thus, one preferred way of combining a liquid with the metal particles is to add liquid in stages, such that when the initial addition of liquid has been absorbed into any pores of the metal particles that may exist, a determination can then be made to add an additional amount of liquid. This staging of liquid introduction can occur up to a point where a small amount of a liquid layer is formed on top of the metal particles which indicates that substantially all of the pores (if any exist) have liquid in them and that any further addition of liquid could lead to the formation of a slurry. This liquid layer on top is preferably not more than about 0.125 ml/cm$^2$ of container's square area. When the metal powder comprises tantalum powder, for example, preferably not more than about 50 ml excess water is on top of the powder, when the powder completely fills a 20 cm×20 cm×5 cm pan.

When pores are present in the metal particles, in order to ensure that the liquid has entered the pores of the metal particles, it is preferred to let the liquid soak with the metal particles for a time sufficient to permit such absorption of the liquid into the pores of the metal particles. For instance, with respect to tantalum powder, it is preferred to let the liquid soak into the powder for at least about five hours, and more preferably, for at least about eight hours, even more preferably from about five hours to about 16 hours. If, during this soaking time additional liquid needs to be added, the liquid can be added at any time in order to ensure full saturation or substantially full saturation of any pores that may exist in the metal particles. Preferably, in the case of tantalum, the amount of liquid present by weight is from about 30% to about 40% by weight of the metal particles present, and more preferably, about 35% by weight based on the weight of the tantalum particles present. Similar amounts of liquid are expected with niobium powder. For other particles, the amount of liquid will be a function of the particle size distribution of metal particles, and therefore the amount of liquid present can be varying amounts.

Preferably an inorganic acid solution is part of the liquid which is added or combined with the metal particles. Preferred inorganic acid comprises phosphoric acid especially when the liquid is deionized water and the metal particles are tantalum, niobium, or alloys thereof. Preferably, from about 10 ppm to about 200 ppm phosphorous by weight of metal particles is present, and to obtain this amount, a sufficient amount of phosphoric acid is present in the liquid and combined with the wet metal particles to obtain the amount of phosphorous in the liquid. The phosphorous can act as a sintering retardant. Other sintering retardants can be used, and can depend on the metal particle sintered.

After the liquid has been combined with the metal particles to form wet metal particles, the wet metal particles are then compacted in order to reduce or eliminate any air pockets between the particles and/or liquid and to reduce the area between the particles. Preferably, the wet particles are compacted in such a manner that the metal particles are closer to one another without forcing any liquid out of the pores that may be present in the pores of the metal particles. Compacting the wet metal particles may also increase the amount of liquid in the pores of the metal particles. The most preferred means of compacting the wet metal particles involves vibrating a container containing the wet metal particles. Any means of vibrating the container can be used, such as manually, or with any device capable of moving a container to create vibrating motions. Preferably, the compacting stage occurs in a non-stick container, such as a "calphalon" tray or other similar type container which has the ability to prevent the "sticking" of material on the sides of the container. During the vibrating stage, additional liquid can be added and should preferably be added if the liquid layer that is preferably present on top begins to disappear. After vibrating, the wet metal particles should have the consistency that is similar to wet cement which has just been applied to a sidewalk and smoothed and compacted. A most preferred consistency is the consistency of a paste that is dispersed from a squeeze tube (e.g., toothpaste). Preferably, the wet metal particles are compacted for at least two minutes and more preferably, from about four minutes to about 20 minutes.

After the compacting stage, it is preferred that the container with the wet metal particles stand still for a sufficient time to permit any water to separate from the wet metal particles. Preferably, the container should sit for at least one hour, and any excess liquid separating can be removed by any means, such as decanting.

After the compacting step, the compacted wet metal particles are formed into a cake by drying. Any means of drying the wet metal particles formed into the cake can be used. For instance, the cake can be dried with the use of a vacuum drying having a sufficient temperature and/or pressure which will dry substantially all of the powder by removing most, if not all of the liquid present. Preferably, the vacuum drying occurs at a temperature of about 195° F. and about 40 torr vacuum for about 10 hours or more, and preferably, for about 14 hours or more.

Once the metal powder cake is dried, the material is preferably heat treated or thermally agglomerated. Preferably, this heat treatment occurs like any other heat treatment of metal powders. For example, the cake can be transferred onto a heat tray and subjected to heat treatment, which can be the heat treatment normally used with the particular type of metal particles involved. In some situations, the temperature of the heat treatment can be lowered because of the properties obtained by using the method of the present invention. For instance, with respect to tantalum powder, the heat treatment is preferably at a temperature of about 1300° C. for about 30 minutes. Other heat treatment temperatures and times can be used.

After heat treatment, the heat treated cake can be deagglomerated (for instance, by grinding or crushing or milling) to produce fine powder for any use. For instance, with respect to tantalum and niobium powders, the powders can be formed into capacitor anodes or for other uses associated with tantalum and niobium powder.

With respect to the flaked metal powders, especially tantalum and niobium flaked powder, the processes of the present invention are preferably conducted by first heat treating the flaked metal powder and then crushing or grinding the heat treated flaked powder to result in agglomerates. Preferably, these agglomerates have the size of from about 50 to about 100 microns in size. These agglomerates are then subjected to the agglomeration process described above with the addition of a volatilizable or vaporizable liquid and so on. After the heat treating of the agglomerated cake comprising the flaked metal powder, the cake is then crushed again to form agglomerates and these agglomerates preferably have the improved properties described herein, including improved green strength.

A combination of properties can be achieved by the present invention. In particular, the flow properties of the metal powder as well as the DF value of the capacitor anodes, in particular, the tantalum powder, can be improved. In particular, with respect to tantalum, a flow of at least about 65 mg/sec and more preferably, from about 65 to about 400 mg/sec can be obtained, and more preferably, from about 159 mg/sec to about 250 mg/sec. In combination with these flow properties, a lower DF value can be obtained. Also, metal powders agglomerated by the present process can have excellent Scott Densities. For instance, the Scott Densities can increase at least 10% and preferably increase at least 25% and more preferably increase at least 35% or more compared to metal powder not agglomerated. Preferably, the Scott Densities are at least about 20 g/inch$^3$, and more preferably, at least 22 g/inch$^3$, and even more preferably, from about 20 to about 40 g/inch$^3$.

Figure 1:
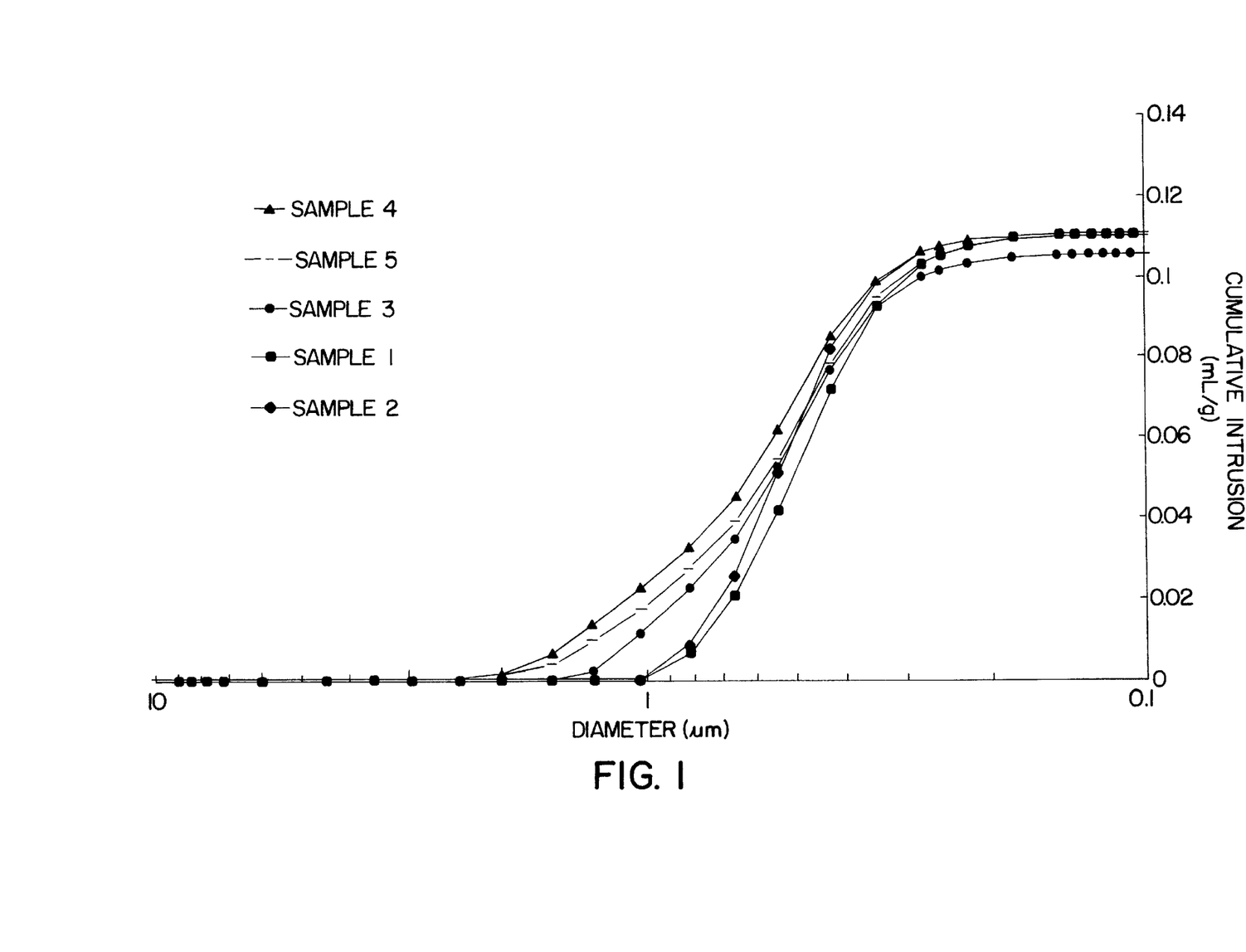
FIGS. 1, 2, 3 and 4 show the results of anode samples made from the agglomerated powders of the present invention.
Figure 2:
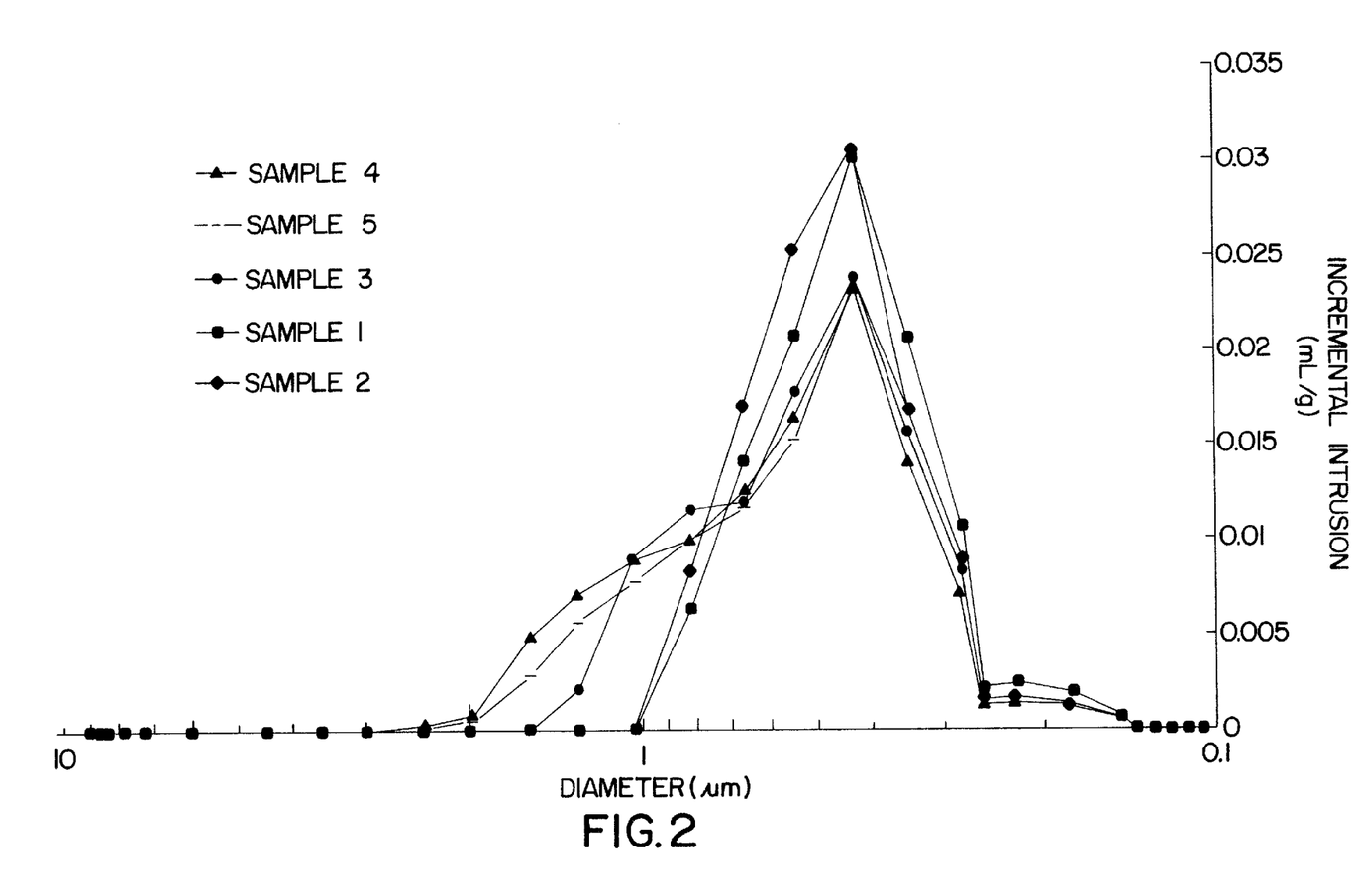
Figure 3:
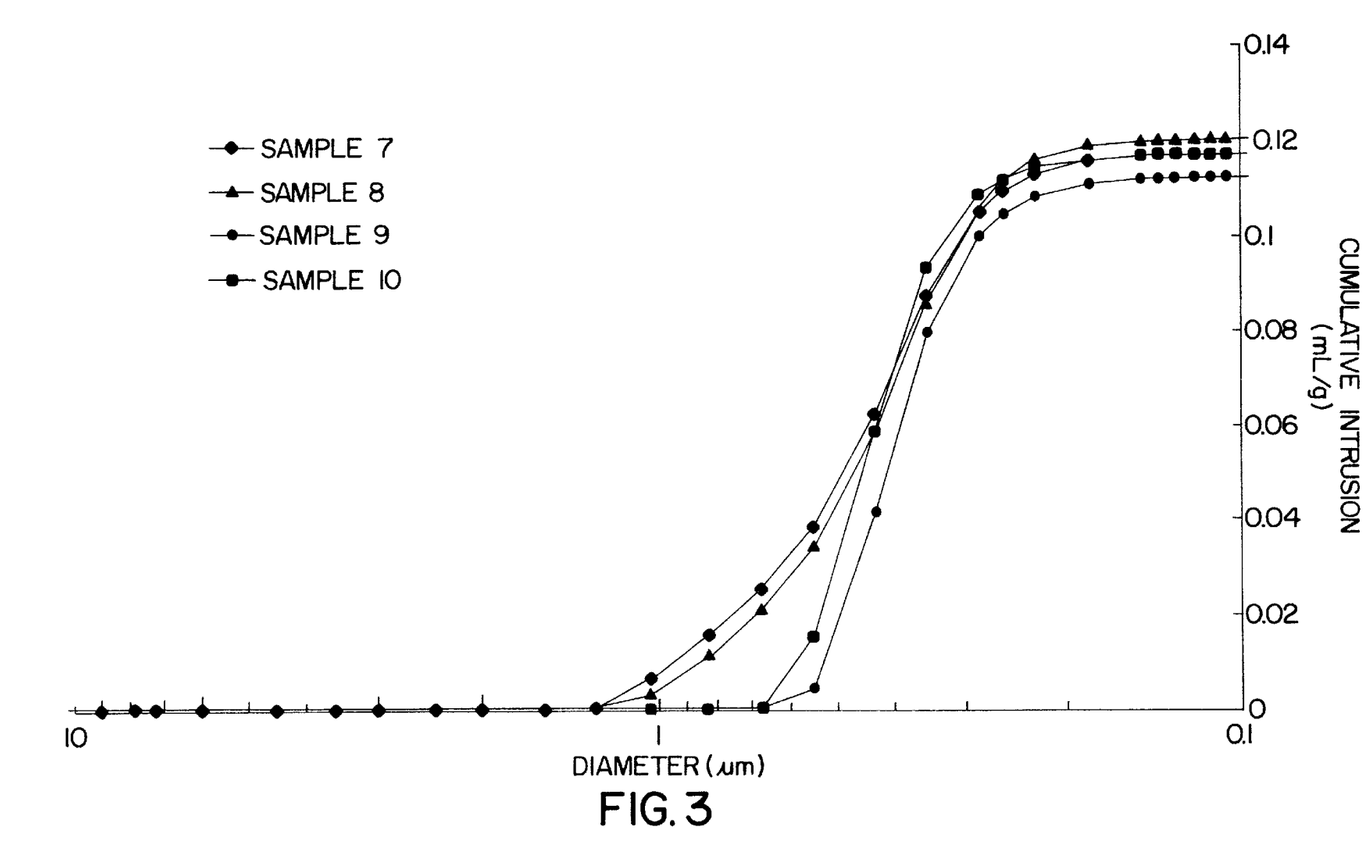
Figure 4:
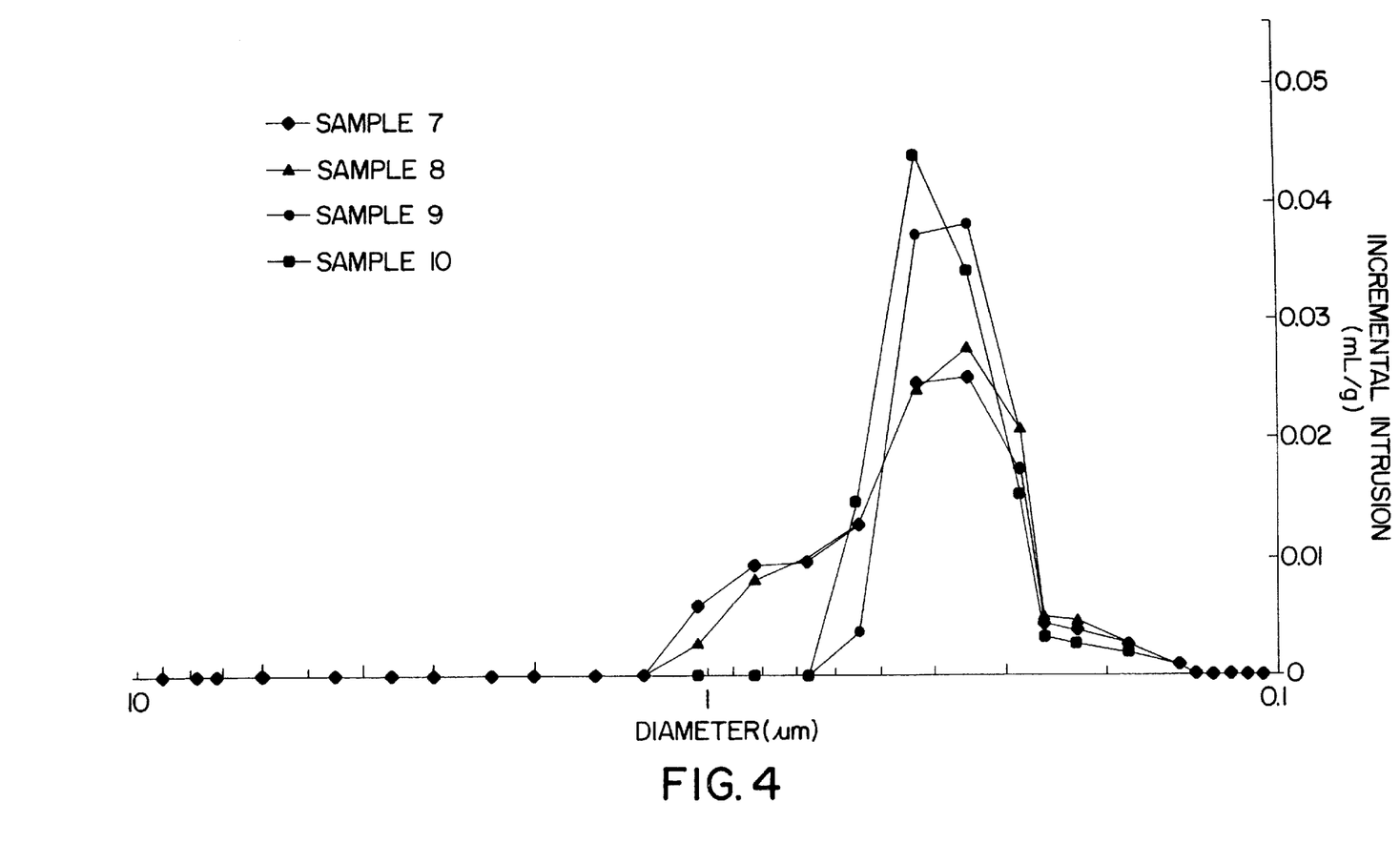

Another benefit of the present invention is the ability to increase the pore size distribution of the metal particles (preferably the metal particles like tantalum and/or niobium), after being pressed and sintered into an anode. Increasing the pore size distribution of the pressed and sintered anode can be very beneficial with respect to capacitor anode for tantalum and/or niobium where typically Mn $(NO_2)_3$ is coated onto the anode and then the material is pyrolized. This increased or improved coverage leads to beneficial properties such as improved flow and/or the DF values. As shown in the Figures, the pore size distribution of the anodes made from the powders of the present invention have large pores (greater in size) that do not exist in anodes made with unagglomerated powder or powders agglomerated by other methods. Also, the number of overall large pores in greater for the anodes of the present invention. The means of making the powder, particularly metal powder, into a capacitor anodes is known to those skilled in the art and such methods such as those set forth in U.S. Pat. Nos. 4,805,074, 5,412,533, 5,211,741, and 5,245,514 and European Patent Application Nos. 0 634 762 A1 and 0 634 761 A1 can be used and are incorporated in their entirety herein by reference.

The present invention will be further clarified by the following examples which are intended to be purely exemplary of the present invention.

EXAMPLES

Samples 1 and 2 were processed using tantalum powder basic lots, properties of which are described in Table A. Each sample was prepared using 12 lbs. of basic lot tantalum. Each basic lot was blended with 2.9 gms. of Ammonium Hexa Fluoro Phosphate ($NH_4PF_6$). $NH_4PF_6$ provided the source of phosphorous and the amount provides 100 ppm of phosphorous by weight in the powder. Each blended sample was heat treated at 1325° C. for 30 minutes at a vacuum level of less than 5 microns of mercury. Samples 1 and 2 represent two separate heat treated batches. Heat treated material which was in the form of cakes was crushed and screened using 70 mesh (US Sieve) screen. The −70 mesh powder was blended with magnesium to have a magnesium content of 2% by weight. Magnesium blended tantalum powder was deoxidized by heating at 950° C. This deoxidation step was conducted to lower the oxygen content of the tantalum powder to reasonable level. The deoxidized tantalum powder was then treated with nitric acid, hydrogen peroxide and deionized water to remove the residual magnesium and the magnesium oxide generated during the deoxidation process. The tantalum powder was further rinsed with deionized water until a conductivity of less than 10 microohms/cm was attained in the DI water. The rinsed tantalum powder was dried using a vacuum dryer. A representative sample of the dried tantalum powder was taken and analyzed for physical, chemical electrical properties of the powder, and pore size distribution using mercury porosimetry equipment. The results are shown in Table 1. The electrical properties were evaluated using the following procedure:

[1] Anode Fabrication:
  (a) Haberer Press
    (1) non-lubed powder
    (2) size−0.1235" dia x. 1928" length
    (3) Dp=5.5 g/cc
    (4) powder wt=207.5 mg
[2] Anode Sintering:
  (a) NRC Furnace; 1335 Deg C*10("A" ramp)
  (b) N=32 anodes of each powder
[3] 30V Ef Evaluation:
  (a) Anodization:
    (1) Two Formations (form each singer separately) N=8 anodes (one tree) per sample (1)tree/sample*(1) sinter*(8) sample=8 trees+C606 stds
    (2) Electrolyte; (0.6% H3P04 @ 83 Deg. 1.86 mmho)
    (3) Constant current density: 337.5 ma/g
    (4) Terminal Voltage=30.0 VDC+/−0.03
    (5) Terminal Voltage Time=300 min −0/+5 min
  (b) DC Leakage:
    (1) Charge E=21.0+/−0.02
    (2) Charge Time=30 sec & 120 sec
    (3) DCL Test Electrolyte=10% H3P04 @ 21 Deg C
  (c) Capacitance/DF:
    (1) Capacitance Test Electrolyte=18% H2S04 @ 21 Deg C
    (2) Bias=2.5 VDC
    (3) Frequency=120 Hz
    (4) Series Capacitance
    (5) GenRad#1658

[4] Mercury Porosimetry Evaluation:

Retained sintered anodes were sent to Micromeritics Instrument Corporation, One Micromeritics Drive, Norcross, Ga. 30093. The pore size distribution was determined at The Materials Analysis Laboratory of Micromeritics using the AutoPore III 9420 and the following settings:

| Penetrometer: | 33 - (14) | 3 Bulb, 0.412 Stem, Powder | |
|---|---|---|---|
| Pen. Constant: | 10.970 μL/pF | Adv. Contact Angle: | 130.000 degrees Fixed |
| Pen. Weight: | 63,6614 g | Rec. Contact Angle: | 130.000 degrees Fixed |
| Stem Volume | 0.4120 mL | Hg Surface Tension: | 485,000 dynes/cm Fixed |
| Max. Heat Pressure | 4.6800 psia | Hg Density: | 13.5335 g/mL |
| Pen. Volume | 3.1251 mL | Sample Weight | 1.6879 |
| | | Assembly Weight | 103.8746 g |
| Low Pressure: | | | |
| Evacuation Pressure: | | 50.000 μmHg | |
| Evacuation Time: | | 5 mins | |
| Mercury Filling Pressure: | | 20.05 psia | |
| Equilibration Time: | | 10 secs | |
| High Pressure: | | | |
| Equilibration Time: | | 10 secs | |
| Blank Correction by Formula | | Fixed by Micromeritics | |

Sample 3 was prepared using the basic lot described in Table A. Two 27.5 lbs. of the basic lot powder were placed in two 5 gallon stainless steel buckets. Phosphorous dopant solution was prepared by adding 10 ml. of 85% reagent grade phosphoric acid (85% solution) into 2000 ml DI water. 4443 ml of DI water was mixed with 551 ml of phosphorous dopant solution. This solution represents 40% by weight of water for 27.5 lbs. of tantalum powder. This solution containing 100 ppm by weight of phosphorous. The 4994 ml of the mixed DI water was added to the tantalum powder by transferring the solution to the stainless steel bucket containing the tantalum powder. Similarly, another 4994 ml DI water+phosphoric acid solution was prepared and transferred to the second stainless steel bucket containing the tantalum powder. The powder was soaked for 20 hrs. The soaked tantalum powder was transferred to tantalum heat treat trays by scooping the wet powder using a stainless steel scoop. Tantalum trays containing the wet tantalum powder were transferred to a vacuum dryer for drying. Powder was dried in a vacuum dryer at 185° F. and about 50 torr vacuum for 48 hrs. After drying, the tantalum trays containing the dried powder was transferred into a heat treat furnace. The powder was heat treated at 1345° C. for 30 minutes at a vacuum level of less than 5 microns of mercury. Heat treated cakes were crushed and screened using a 50 mesh (US Sieve). The −50 mesh powder was blended with 2% magnesium and deoxidized and further processed as described for samples 1 and 2.

Samples 4 and 5 of agglomerated tantalum powder were prepared as follows. The basic lot tantalum powder used for the two samples is shown in Table A. In each case, fifty pound increments of tantalum powder were placed in stainless steel buckets. Total tantalum powder used was 250 lbs. for both samples 4 and 5. 6944 ml of deionized water was mixed with 1002 ml. of phosphorous dopant solution described above in Example 1. 7966 ml of the solution was added to each bucket. This solution represent 35% by weight of tantalum powder and it also contains 100 ppm by weight of phosphorous. The water was allowed to soak into the tantalum powder for approximately 12 to 16 hours. Afterwards, approximately 8.1 pounds of the wet tantalum powder was transferred to a drying tray. Drying trays consisted of square cake pans (8×8×2 inches) from "Calphalon." Calphalon supplies the bakeware with an advanced nonstick coating system. The calphalon tray containing the wet tantalum powder was transferred to a vibrating unit. The vibrating unit consisted of a vibrating table fitted with an air operated motor working at a pressure of 60 psi. Additional deionized water in an amount of 150 ml was added to each tray and was vibrating for approximately four minutes. After vibrating, the trays were allowed to sit for at least sixty minutes for any water to separate. Any water which separated was decanted. Afterwards the drying trays were transferred to a vacuum dryer. The commercial vacuum drying was purchased from STOKES VACUUM Inc., model number 338J. The material in the Calphalon trays was dried for approximately 14 hours at about 195° F. and 50 torr pressure. The dried tantalum powder was then transferred to a tantalum tray for heat treatment. The heat treatment was conducted at approximately 1320–1330° C. for about 30 minutes. The cakes were then transferred to a batch can for milling and were milled and screened using 70 mesh (US Sieve) screen. −70 mesh portion of the material was deoxidized and acid leached as described in Example 1. Samples of the final product were analyzed and the data is shown in Table 1.

Samples 7–10 were processed using tantalum basic lots of higher surface area. Typical analysis of the basic lot used is described in Table A.

Samples 9 and 10 were processed using the conventional process. Typically 12 lbs. of tantalum powder was blended with ammonium hexafluorophosphate to add 100 ppm by weight phosphorous. The blended powder was heat treated in the range of 1200–1265° C. for 30 minutes under vacuum. The heat treated cakes were processed to final powder as described for sample 1. The deoxidation for these powders were conducted at 850° C. with 2.5% magnesium added. The electrical evaluation procedure for these samples is described below.

[1] Anode Fabrication:
  (a) Haberer Press
    (1) non-lubed powder
    (2) size −0.1545" dia x. 0.1363" length
    (3) Dp=4.5 g/cc
    (4) powder wt=188 mg
[2] Anode Sintering:
  (a) NRC Furnace; 1265 Deg C*10("A" ramp)
  (b) N=34 anodes of each powder sample
[3] 30V Ef Evaluation:
  (a) Anodization:
    (1) One Formation N=8 anodes (one tree) per sample
    (2) Electrolyte; (0.6% H3P04 @ 83 Deg. 2.86 mmho)
    (3) Constant current density: E251 Test Current (337.5 ma/g)
    (4) Terminal Voltage=30.0 VDC +/−0.03
    (5) Terminal Voltage Time=300 min −0/+5 min
    (6) Soak 25C for 30 minutes
    (7) 100° C. over for 30 minutes
  (b) DC Leakage:
    (1) Charge E=21.0+/−0.02
    (2) Charge Time=30 sec & 120 sec
    (3) DCL Test Electrolyte=10% H3P04 @ 21 Deg C
  (c) Capacitance/DF:
    (1) Capacitance Test Electrolyte=18% H2S04 @ 21 Deg C
    (2) Bias=2.5 VDC
    (3) Frequency=120 Hz
    (4) Series Capacitance Microporosimety evaluation using the sintered anodes was conducted at Micromeitics using the AutoPore III 9420.

Samples 7 and 8 were prepared using the basic lot described in Table A. Sample 7 was prepared by soaking 24 pounds to tantalum with 25% by weight of deionized water containing phosphorous dopant solution to provide 100 ppm by weight of phosphorous. The powder was soaked for 16 hours. Soaked powder was transferred to four Calphalon trays and additional 300 to 450 ml of deionized water was added. The wet powder was vibrated from four minutes using the vibrating table. After vibrating, the trays were allowed to sit for at least sixty minutes for any water to separate. Any water which separated was decanted. Afterwards, the drying trays were transferred to a vacuum dryer. The commercial vacuum dryer was purchased from STOKES VACUUM Inc., model number 338J. The material in the Calphalon trays was dried for approximately 14 hours at about 196° F. and 50 torr pressure. The dried tantalum powder was then transferred to a tantalum tray for heat treatment. The heat treatment was conducted at approximately 1265° C. for about 30 minutes. The cakes were then transferred to a batch can for milling and were milled and screened using 70 mesh (US Sieve) screen. −70 mesh portion of the material was deoxidized using 2.5% magnesium at 850° C. and acid leached as described in Example 1. Samples of the final product were analyzed and the data is shown in Table 1.

Sample 8 was prepared by soaking 24 pounds of tantalum with 35 % by weight of deionized water containing phosphorous dopant solution to provide 100 ppm by weight of phosphorous. The powder was soaked for 16 hours. Soaked powder was transferred to four Calphalon trays and additionally 150 to 235 ml of deionized water was added. The wet powder was vibrated for four minutes using the vibrating table. After vibrating, the trays were allowed to sit for at least sixty minutes for any water to separate. Any water which separated was decanted. Afterwards, the drying trays were transferred to a vacuum drying. The commercial vacuum dryer was purchased from STOKES VACUUM Inc., model number 338J. The material in the Calphalon trays was dried for approximately 14 hours at about 195° F. and 50 torr pressure. The dried tantalum powder was then transferred to a tantalum tray for heat treatment. The heat treatment was conducted at approximately 1200° C. for about 30 minutes. The cakes were then transferred to a batch can for milling and were milled and screened using 70 mesh (US Sieve) screen. −70 mesh portion of the material was deoxidized using 2.5% magnesium at 850° and acid leached as described in Example 1. Samples of the final product were analyzed and the data is shown in Table 1.

TABLE A

Starting material for various samples (basic lots)

| | Samples 1 and 2 | Sample 3 | Sample 4 | Sample 5 | Samples 7–10 |
|---|---|---|---|---|---|
| Weights | 26 lbs. | 51.5 lbs. | 250 lbs. | 250 lbs. | 80 lbs. |
| FSS Modified (microns) | 0.41 | 0.39 | 0.4 | 0.42 | 0.32 |
| Scott Density (grams/inch3) | 13.5 | 21.9 | 14 | 13.9 | 12.6 |
| C (ppm) | 22 | 4 | 16 | 17 | 18 |
| O (ppm) | 6253 | 7144 | 6343 | 6048 | 7026 |
| N (ppm) | 25 | 151 | 25 | 23 | 26 |
| Hydrogen (ppm) | 1585 | 1078 | 1488 | 1360 | 1520 |
| BET (meter2/gm) | 2.25 | 1.9 | 1.81 | 2.22 | 2.80 |

The material was then pressed to form a capacitor anode in the following manner:

The powder was pressed into 0.1235" dia X.1928" length anodes at a press density of 5.5 gm/cc. The pressed anodes were sintered at 1335° C. for 10 minutes followed by anodization at 30v. using $H_3PO_4$ electrolyte. The anodized anodes were tested for capacitance and DC leakage, press density, and shrinkage.

Tantalum powder was also processed to make 300 mf 10V solid capacitor and the DF values of the solid capacitor were measured.

The flow rate was determined by a die fill test which involved a stand having 10 holes, ⅛ inch diameter evenly spaced along the center line of the bar length. The die fill procedure was done in a room with a relative humidity of less than 70% and a temperature at normal room temperature. 40 grams of metal powder, in this case, tantalum powder, were placed in a hopper which passed over the 10 holes of the stand wherein powder flows into the holes as the hopper passes over them. A slide bar is located underneath the stand so as to cover each of the ten holes to prevent the powder from falling out of the stand. There are 4 tests involved in determining flow rate wherein a hopper is passed over the ten holes with an even 2 sec. pass, 4 sec. pass, 6 sec. pass, and an 8 sec. pass, wherein during each pass the hopper is opened so that the powder flows over the 10 holes. After each of the passes, the amount of powder in the holes is weighed and eventually calculations are made determining the flow based on mg/sec.

The Table below sets forth the various parameters of each of the samples made and tested. As can be seen from the Table and Figures, the flow rate and the pore size distribution of the powders of the present invention were unexpectedly superior to unagglomerated tantalum powder and to agglomerated tantalum powder formed by a different process.

Data for the 52,000 cv/gm powder samples

| Sample ID Process | Sample 1 774-9.4M No Preagglom | Sample 2 7774-16.4M No Preagglom | Sample 3 7549.70-M Non-Vibrated | Sample 4 110395 Present Inv. | Sample 5 110396 Present Inv. |
|---|---|---|---|---|---|
| Weights | 9.4 lbs. | 9.5 | 43.6 lbs. | 233.8 lbs. | 228.3 lbs. |
| FSS | 1.00 | 1.05 | 3.29 | 2.94 | 2.63 |
| Modified (microns) | | | | | |
| Scott Density (grams/inchs) | 19.0 | 20.2 | 25.1 | 27.8 | 26.3 |
| C (ppm) | 195 | 40 | 32 | 20 | 18 |
| O (ppm) | 4,070 | 3,123 | 3,109 | 3,310 | 3,514 |
| N (ppm) | 214 | 121 | 166 | 66 | 57 |
| H (ppm) | 87 | 83 | 58 | 53 | 53 |
| P (ppm) | 101 | 122 | 109 | 167 | 177 |
| Screens | | | | | |
| +60 mesh | 0 | 0 | 1.9 | 0 | 0 |
| −60 +100 mesh | 2.6 | 2.8 | 37.9 | 10.4 | 9.6 |
| −100 +200 mesh | 19.5 | 18.7 | 31.1 | 38.2 | 35.7 |
| −200 +325 mesh | 17.7 | 16.3 | 13.8 | 16.6 | 16.9 |
| −325 mesh | 60.2 | 62.2 | 15.1 | 34.8 | 37.8 |
| Flow mg/s | 37 | 37 | 235 | 182 | 175 |
| 1335C/30 V | | | | | |
| Cap cv/g | 60,246 | 55,355 | 54,926 | 52,734 | 55,329 |
| Shrinkage (%) | 2.9 | 2.8 | 2.5 | 1.2 | 1.6 |
| Sint. Den. (grams/cc) | 5.8 | 5.8 | 5.9 | 5.7 | 5.7 |
| DCL na/cf | 0.34 | 0.62 | 0.18 | 0.21 | 0.25 |

Data for higher capacitance powders

| Process | Sample 7 Present Inv. | Sample 8 Present Inv. | Sample 9 No Agglom | Sample 10 No Agglom. |
|---|---|---|---|---|
| Weights | 7.5 lbs. | 8.3 lbs. | 11 lbs. | 10 lbs. |
| FSS | 1.61 | 1.4 | 0.58 | 0.67 |
| Scott Density (g/in) | 26.7 | 23.6 | 16.3 | 17.4 |
| C (ppm) | 22 | 32 | 26 | 36 |
| O (ppm) | 5,762 | 5,335 | 6,368 | 5,057 |
| N (ppm) | 27 | 26 | 67 | 58 |
| H (ppm) | 200 | 227 | 207 | 200 |
| P (ppm) | 36 | 57 | 101 | 43 |
| Screens | | | | |
| +60 | 0 | 0 | 0.5 | 0 |
| −60 +100 | 12.8 | 9.8 | 4.4 | 5.9 |
| −100 +200 | 36.5 | 36.6 | 28.4 | 28.3 |
| −200 +325 | 19.2 | 19.9 | 31.8 | 26.7 |
| −325 | 31.5 | 33.7 | 34.9 | 39.1 |
| Flow mg/s | 78 | 56 | 4.7 | 5.9 |
| Press density 4.5 gms/cc 1265C/30 V | | | | |
| Cap cv/g | 80,135 | 83,282 | 85,372 | 81,752 |
| Shrinkage | 2 | 2.4 | 3.7 | 2.5 |
| Sint. Den. | 4.7 | 4.7 | 4.9 | 4.8 |
| DCL na/cv | 0.27 | 0.26 | 0.34 | 0.31 |

As shown in FIGS. 1–4, anode samples 4 and 5 and 7 and 8 made from powders agglomerated by the method of the present invention had larger sizes that didn't exist in the remaining samples and also had a higher number of large pores than the remaining samples. Accordingly, the pore size distribution was considerably better for the samples of the present invention in view of these two improved parameters. These improved parameters are predictive indicators with regards to a lower Dissipation Factor for the anode and other beneficial properties.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. Agglomerated particles obtained by a method to agglomerate tantalum or niobium particles or both comprising:
   a) combining a volatilizable or vaporizable liquid with particles comprising tantalum, niobium, or both to form wet particles, wherein the volatilizable or vaporizable liquid is added in an amount to form a paste but not a slurry and said particles soak in said volatilizable or vaporizable liquid;
   b) compacting the wet particles;
   c) drying the wet compacted particles to form a cake; and
   d) heat treating the cake.

2. Agglomerated particles of claim 1, wherein said compacting is accomplished by vibrating said wet particles in a container.

3. Agglomerated particles of claim 1, wherein said compacting is accomplished by applying pressure to said wet particles.

4. The agglomerated particles of claim 1, wherein said particles have a flow rate of at least about 65 mg/sec and a pore size distribution greater than unagglomerated particles.

5. The particles of claim 4, wherein said particles have a flow rate of at least about 100 mg/sec.

6. The particles of claim 4, wherein said particles have a flow rate of at least about 150 mg/sec.

7. The particles of claim 4, wherein said particles have a flow rate of at least about 175 mg/sec.

8. The particles of claim 4, wherein said particles have a flow rate of at least about 200 mg/sec.

9. The particles of claim 4, wherein said particles comprise niobium.

10. The particles of claim 4, wherein said particles comprise tantalum.

11. The particles of claim 4, wherein said pore size distribution is greater than unagglomerated particles by at least 10% with respect to greater diameter pores.

12. The particles of claim 4, wherein said particles are nodular tantalum powder.

13. The particles of claim 4, wherein said particles are nodular niobium powder.

14. The particles of claim 12, wherein said particles have a Scott Density of at least 20 g/inch$^3$.

15. The particles of claim 12, wherein said particles have a Scott Density of about 20 g/inch$^3$ to about 40 g/inch$^3$.

16. A capacitor component comprising the tantalum powder of claim 10.

17. A capacitor component comprising the niobium powder of claim 9.

18. The capacitor component of claim 16, wherein said component is a capacitor anode.

19. The capacitor component of claim 17, wherein said component is a capacitor anode.

20. The agglomerated particles of claim 1, wherein said particles are nodular tantalum powder.

21. The agglomerated particles of claim 1, wherein said particles are nodular niobium powder.

22. The agglomerated particles of claim 2, wherein said particles are nodular tantalum powder.

23. The agglomerated particles of claim 2, wherein said particles are nodular niobium powder.

24. The agglomerated particles of claim 3, wherein said particles are nodular tantalum powder.

25. The agglomerated particles of claim 3, wherein said particles are nodular niobium powder.

26. A capacitor component comprising the agglomerated particles of claim 1.

27. The capacitor component of claim 26, wherein said component is a capacitor anode.

28. The capacitor component of claim 27, wherein said agglomerated particles is nodular tantalum powder.

29. The capacitor component of claim 27, wherein said agglomerated particles are nodular niobium powder.

30. A capacitor component comprising the agglomerated particles of claim 2.

31. The capacitor component of claim 30, wherein said component is a capacitor anode.

32. The capacitor component of claim 31, wherein said agglomerated particles are nodular tantalum powder.

33. The capacitor component of claim 31, wherein said agglomerated particles are nodular niobium powder.

34. A capacitor component comprising the agglomerated particles of claim 3.

35. The capacitor component of claim 34, wherein said component is a capacitor anode.

36. The capacitor component of claim 35, wherein said agglomerated particles are nodular tantalum powder.

37. The capacitor component of claim 35, wherein said agglomerated particles are nodular niobium powder.

38. The agglomerated particles of claim 1, wherein said tantalum, niobium, or both have pores wherein said volatilizable or vaporizable liquid in step a) soaks into said pores.

* * * * *